United States Patent
You

(10) Patent No.: US 9,853,706 B2
(45) Date of Patent: Dec. 26, 2017

(54) METHOD AND APPARATUS FOR MAPPING BASEBAND SIGNAL INTO BEAMSPACE

(71) Applicant: ELECTRONICS AND TELECOMMUNICATIONS RESEARCH INSTITUTE, Daejeon (KR)

(72) Inventor: DukHyun You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/379,734

(22) Filed: Dec. 15, 2016

(65) Prior Publication Data

US 2017/0180027 A1 Jun. 22, 2017

(30) Foreign Application Priority Data

Dec. 18, 2015 (KR) .................. 10-2015-0182229
Dec. 14, 2016 (KR) .................. 10-2016-0170732

(51) Int. Cl.
H04W 72/00 (2009.01)
H04B 7/06 (2006.01)
H04W 72/12 (2009.01)
H01Q 21/06 (2006.01)
H04B 7/0413 (2017.01)

(52) U.S. Cl.
CPC ........... *H04B 7/0617* (2013.01); *H01Q 21/06* (2013.01); *H04W 72/1263* (2013.01); *H04B 7/0413* (2013.01)

(58) Field of Classification Search
None
See application file for complete search history.

(56) References Cited

U.S. PATENT DOCUMENTS

| | | | | |
|---|---|---|---|---|
| 2004/0192394 | A1* | 9/2004 | Nakaya | H01Q 3/2605 455/562.1 |
| 2006/0261968 | A1* | 11/2006 | Shirakawa | G01S 3/38 340/671 |
| 2009/0309799 | A1* | 12/2009 | Hossain | H01Q 3/44 343/754 |
| 2010/0277370 | A1 | 11/2010 | Park et al. | |
| 2015/0139371 | A1 | 5/2015 | Seo et al. | |

OTHER PUBLICATIONS

Junyeong Bok, et al., "Design and Performance Evaluation of M×M MIMO Transmission in ESPAR Antenna", JKICS, vol. 38A No. 12, Aug. 2013.
Panagiotis N. Vasileiou, et al., "Adaptive Basis Patterns Computation for Electronically Steerable Passive Array Radiator Antennas", 2013 IEEE.

* cited by examiner

*Primary Examiner* — Idowu O Osifade
(74) *Attorney, Agent, or Firm* — LRK Patent Law Firm

(57) ABSTRACT

A transmitting apparatus in a communication system using a single radio frequency (RF) chain generates baseband signals to be transmitted, decomposes a steering vector of an antenna to generate a plurality of beam basis patterns orthogonal to each other, and maps the baseband signals into at least one baseband pattern using geometrical information of the plurality of beam basis patterns.

18 Claims, 5 Drawing Sheets

METHOD AND APPARATUS FOR MAPPING BASEBAND SIGNAL INTO BEAMSPACE

CROSS-REFERENCE TO RELATED APPLICATION(S)

This application claims priority to and the benefit of Korean Patent Application Nos. 10-2015-0182229 and 10-2016-0170732, filed in the Korean Intellectual Property Office on Dec. 18, 2015 and Dec. 14, 2016, respectively, the entire contents of which are incorporated herein by reference.

BACKGROUND OF THE INVENTION

1. Field of the Invention

The present invention relates to a method and an apparatus for mapping a baseband signal into a beamspace, and more particularly, to a method and an apparatus for mapping a baseband signal into a beamspace (specific antenna port) in a communication system.

2. Description of Related Art

In recent years, various communication technologies have adopted a multiple inputs multiple outputs (MIMO) technique. The MIMO technique is an essential method for increasing a data transmission rate and may expect an effect of maximizing frequency efficiency. As the representative example, there are IEEE 802.16 and IEEE 802.20 of a portable Internet system and a standard of Wibro system and a cellular communication system called long term evolution (LTE) of 3th generation partnership project (3GPP) has also adopted the MIMO technique.

The transmission performance in the MIMO communication system is generally increased in proportion to the number of antennas. Therefore, to maximize the MIMO performance, the number of antennas needs to be increased and thus the number of radio frequency (RF) chains needs to be increased. However, if the number of antennas is increased, complexity of the system is increased and a size of the system is increased. Therefore, there is a disadvantage in that the number of antennas may not be increased blindly. To overcome the restrictions, recent researches for achieving MIMO performance using a single RF chain have been conducted. As the representative example, there is a single RF MIMO technology using an electrical steering parasitic array radiator antenna (ESPAR) or a load modulation antenna.

Compared to the existing technology, the technology takes a slight different form in terms of an antenna/RF and a baseband. Referring to the antenna/RF, the existing MIMO technology uses a plurality of active antenna elements to configure an antenna but the single RF MIMO technology uses one active antenna element or a small number of active antenna elements and a plurality of parasitic antenna elements to configure an antenna. The structure has an advantage of expanding the number of antennas through the plurality of parasitic antenna elements and disposing a distance between the parasitic antenna elements to be narrower than the general active antennas to reduce the size of the antenna. Further, the single RF chain is used and therefore the RF chain is not complicated, such that the size of the RF chain may be implemented to be small. Further, when the distance between the antennas is not a great problem and the complexity of the RF chain is a main issue, the antennas may be disposed by increasing the distance therebetween using the load modulation antenna and the single RF chain.

Referring to the baseband, the existing MIMO technology uses the plurality of active antenna elements, and therefore I/Q signals for the baseband signals are mapped into each antenna and the performance does not depend greatly on into which of the antennas each signal is mapped In contrast, the single RF MIMO technology has only one RF chain and therefore does not use a scheme of mapping the baseband signals into each antenna but use a scheme of mapping all antenna beam patterns generated by one active antenna element and a small number of active antenna elements and the plurality of parasitic antenna elements into a plurality of decomposed orthogonal beams. At this point, the beam into which the baseband signal is mapped has different shapes and therefore there is a difference in the transmission performance as the existing technology. That is, there are various methods for mapping the baseband signal into which of the beams and a specific method may not properly secure the transmission performance. Therefore, there is a need for a method for mapping a baseband signal into a beam while securing proper transmission performance when a single RF MIMO is used.

SUMMARY OF THE INVENTION

The present invention has been made in an effort to provide a method and an apparatus for mapping a baseband signal into a beamspace while securing proper transmission performance or improving transmission performance in single RF MIMO environment.

An exemplary embodiment of the present invention provides a method for mapping a baseband signal into a beamspace by a transmitting apparatus in a communication system using a single radio frequency (RF) chain. The method includes: generating baseband signals to be transmitted; decomposing a steering vector of an antenna to generate a plurality of beam basis patterns orthogonal to each other; and mapping the baseband signals into at least one beam basis pattern using geometrical information of the plurality of beam basis patterns.

The geometrical information may include area information.

The mapping may include mapping a baseband signal corresponding to a low antenna port index in an order of a beam basis pattern having a large arrival area.

The mapping may include mapping a baseband signal corresponding to a high antenna port index in an order of a beam basis pattern having a large arrival area.

The geometrical information may include direction information.

The mapping may include: grouping the plurality of beam basis patterns into at least one beam basis group based on a direction of the plurality of beam basis patterns; and mapping cell common signals and UE-specific signals into beam basis patterns within the at least one beam basis group.

The mapping of the cell specific signal and the UE-specific signals into the beam basis patterns may include mapping a cell common signal into a beam basis pattern having the largest arrival area within the at least one beam basis group; and mapping the UE-specific signal into the rest beam basis patterns other than the beam basis pattern having the largest arrival area within the at least one beam basis group.

The steering vector may be determined depending on a geometrical structure of the antenna.

The antenna may include one of an electrical steering parasitic array radiator antenna (ESPAR), a switched parasitic array (SPA), and a load modulation antenna.

The method may further include: forming a final beam by linearly coupling mapped beam basis patterns with baseband signals.

Another embodiment of the present invention provides an apparatus for mapping a baseband signal into a beamspace in a communication system. The apparatus includes: a baseband signal processing unit generating baseband signals to be transmitted; a beamspace mapping unit decomposing a steering vector of an antenna to generate a plurality of beam basis patterns orthogonal to each other and mapping the baseband signals into at least one baseband pattern based on geometrical information of the plurality of beam basis patterns and characteristics of the baseband signals; a single RF chain converting the baseband signals into a radio frequency (RF) band signal; and an antenna radiating a signal output from the single RF chain.

The geometrical information may include area information.

The beamspace mapping unit may map a baseband signal corresponding to a low antenna port index in an order of a beam basis pattern having a large arrival area.

The beamspace mapping unit may map a baseband signal corresponding to a high antenna port index in an order of a beam basis pattern having a large arrival area.

The geometrical information may include direction information.

The beamspace mapping unit may group the plurality of beam basis patterns into at least one beam basis group based on a direction of the plurality of beam basis patterns and map cell common signals and UE-specific signals into beam basis patterns within the at least one beam basis group.

The beamspace mapping unit may map the cell common signal into the beam basis pattern having the largest arrival area within the at least one beam basis group and map the UE-specific signal into the rest beam basis patterns other than the beam basis pattern having the largest arrival area.

The antenna may include one of an electrical steering parasitic array radiator antenna (ESPAR), a switched parasitic array (SPA), and a load modulation antenna.

DETAILED DESCRIPTION OF THE EMBODIMENTS

Figure 1:
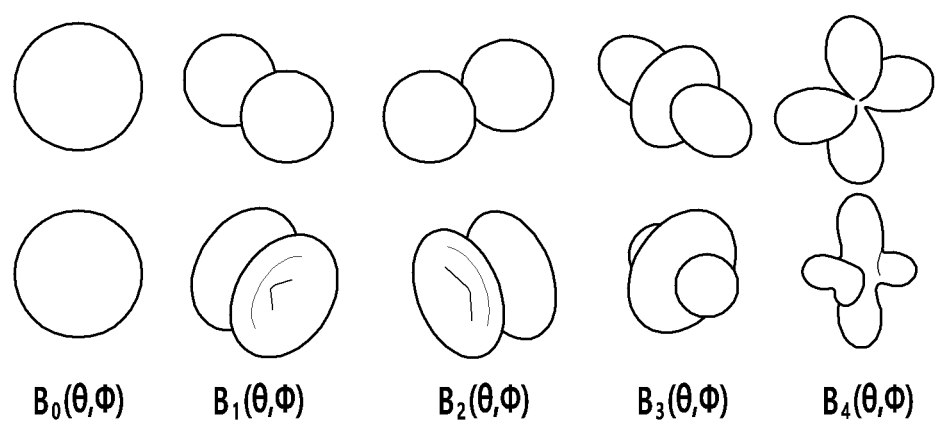
FIG. 1 is a diagram illustrating an example of a beam shape depending on a beam basis pattern according to an exemplary embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and claims, unless explicitly described to the contrary, "comprising" any components will be understood to imply the inclusion of other elements rather than the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may also include all or some of the functions of the MT, the MS, the AMS, the HR-MS, the SS, the PSS, the AT, the UE, and the like Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, small base stations [a femto base station (femoto BS), a home node B (HNB), a home eNodeB (HeNB), a pico base station (pico BS), a metro base station (metro BS), a micro base station (micro BS), and the like], and the like and may also include all or some of the functions of the ABS, the node B, the eNodeB, the AP, the RAS, the BTS, the MMR-BS, the RS, the RN, the ARS, the HR-RS, the small base stations, and the like.

Hereinafter, a method and an apparatus for mapping a baseband signal into a beamspace according to an exemplary embodiment of the present invention will be described in detail with the accompanying drawings.

Generally, in a single RF MIMO, a steering vector of an antenna is decomposed to generate orthogonal beam bases to which the baseband signal will be transmitted and the baseband signal is transmitted by being carried on the beam basis. In this case, the steering vector of an antenna element is generally determined by a geometrical structure of an antenna and when the geometrical structure of the antenna is changed, the steering vector is also changed.

Generally, if the steering vector is decomposed, beam basis patterns orthogonal to each other may be obtained as many as the number of antennas. Here, a method for obtaining a beam basis pattern orthogonal to each other may be various. As the representative example, the steering vector of the antenna is separated into the beam basis patterns orthogonal to each other as many as the number of antennas by using a Gram-Schmidt process that has been mainly used in linear algebra.

As such, the beam basis patterns orthogonal to each other may be defined by various methods and if the steering vector of the antenna is determined, may be immediately calculated by using the Gram-Schmidt process. In other words, when the geometrical structure of the antenna is determined, it may be understood that the beam basis pattern to which the baseband signal will be transmitted may be determined in advance Generally, the beam basis patterns each have different beam shapes, such that a region which the beam may reach may be limited. Therefore, like the existing MIMO scheme, when signals are mapped to each general antenna array, the case in which a specific signal is not reached may occur.

FIG. 1 is a diagram illustrating an example of a beam shape depending on a beam basis pattern according to an exemplary embodiment of the present invention.

As illustrated in FIG. 1, when the steering vector of the antenna is separated into five beam basis patterns [$B_0(\theta, \phi)$, $B_1(\theta, \phi)$, $B_2(\theta, \phi)$, $B_3(\theta, \phi)$, $B_4(\theta, \phi)$], the beam basis pattern $B_0$ may be transmitted in all directions but the rest beam basis patterns [$B_1(\theta, \phi)$, $B_2(\theta, \phi)$, $B_3(\theta, \phi)$, $B_4(\theta, \phi)$] other than the beam basis pattern [$B_0(\theta, \phi)$] may each be transmitted in different directions and therefore may not be transmitted in a specific direction. Therefore, when the signal is mapped to the beam basis pattern without information on the area of the beam basis pattern, a capacity loss may occur. In FIG. 1, when specific points (x, y, z) of a 3D space are represented by a polar coordinate system, among defined (r, $\theta$, $\phi$)), $\theta$ is defined by an angle from an X axis in a space between X and Y axes and $\phi$ is defined by an angle from a Z axis.

Further, the information on the area of the beam basis patterns [$B_0(\theta, \phi)$, $B_1(\theta, \phi)$, $B_2(\theta, \phi)$, $B_3(\theta, \phi)$, $B_4(\theta, \phi)$] is changed depending on the geometrical structure of the antenna, and therefore when the antenna is formed, the area of the beam basis pattern is not changed.

Figure 2:
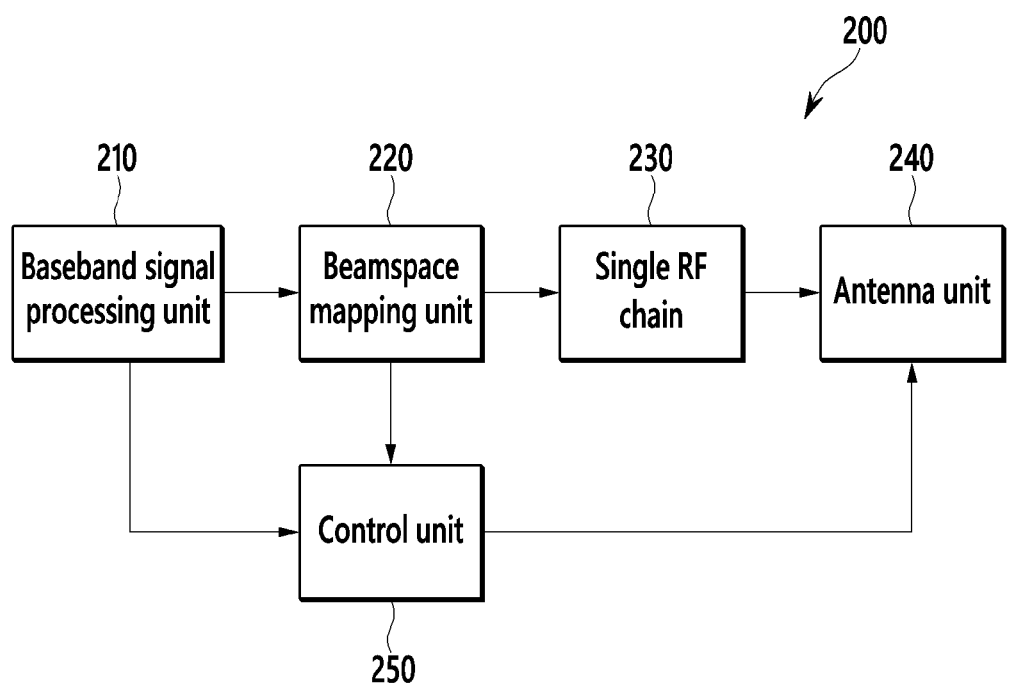
FIG. 2 is a diagram illustrating an apparatus for mapping a baseband signal into a beamspace according to an exemplary embodiment of the present invention.

FIG. 2 is a diagram illustrating an apparatus for mapping a baseband signal into a beamspace according to an exemplary embodiment of the present invention.

Referring to FIG. 2, an apparatus 200 for mapping a baseband signal into a beamspace includes a baseband signal processing unit 210, a beamspace mapping unit 220, a single RF chain 230, and an antenna unit 240. Further, the apparatus 200 further includes a control unit 250. The apparatus 200 may be implemented in a transmitting apparatus that transmits a signal. The transmitting apparatus may be part of a terminal and a base station. The apparatus 200 may use at least one processor to perform functions of the baseband signal processing unit 210, the beamspace mapping unit 220, the single RF chain 230, and the control unit 250. The processor may mean a central processing unit (CPU), a graphics processing unit (GPU), or an exclusive process that performs methods according to exemplary embodiments of the present invention.

The baseband signal processing unit 210 generates a baseband signal to be transmitted. A method for generating, by the baseband signal processing unit 210, the baseband signal may be appreciated by a person having ordinary skill in the art to which the present invention pertains and the detailed description thereof will be omitted.

The beamspace mapping unit 220 maps the baseband signal into the beamspace. If the steering vector is determined based on the geometrical structure of the used antenna, the beamspace mapping unit 220 decomposes the steering vector to generate a plurality of beam basis patterns orthogonal to each other as many as the number of antennas and map the baseband signal into the plurality of beam basis patterns. The beam basis pattern represents the beamspace. According to the exemplary embodiment of the present invention, the beamspace mapping unit 220 may map the baseband signals into the beam basis patterns in consideration of an area and a direction of the beam basis pattern and characteristics of the baseband signal to be transmitted. Further, the beamspace mapping unit 220 determines a final beam radiated toward a wireless space by linearly coupling the beam basis patterns with the baseband signals to be spatially multiplexed.

The single RF chain 230 converts the baseband signals into an RF band signal. Here, the single RF chain may be implemented by a digital to analog converter (DAC), a filter, an oscillator, or the like. Meanwhile, the single RF chain 230 may mean one RF chain as well as a small number of RF chains.

The antenna unit 240 may include one active antenna element and a plurality of parasitic antenna elements to generate a beamspace MIMO signal. Each parasitic antenna element is applied with a reactance to form a final beam. The antenna unit 240 may be implemented by ESPAR, a switched parasitic array (SPA), a load modulation antenna, or the like and may have other structures to implement beamspace MIMO.

The control unit 250 controls the antenna unit 240 to derive a final radiation pattern determined by linearly coupling the baseband signal with the beam basis. In particular, the control unit 250 controls a reactance component that depends on the parasitic antenna element.

The beam radiated from the antenna unit 240 generally depends on a current and a voltage flowing in the antenna element, and thus the current and the voltage flowing in each antenna element may be calculated to derive a specific radiation pattern.

The control unit 250 controls the reactance components connected with each parasitic antenna element to derive the final radiation pattern determined by linearly coupling the baseband signal with the beam basis so as to make the defined current flow in each parasitic antenna element, thereby generating the corresponding radiation pattern.

Figure 3:
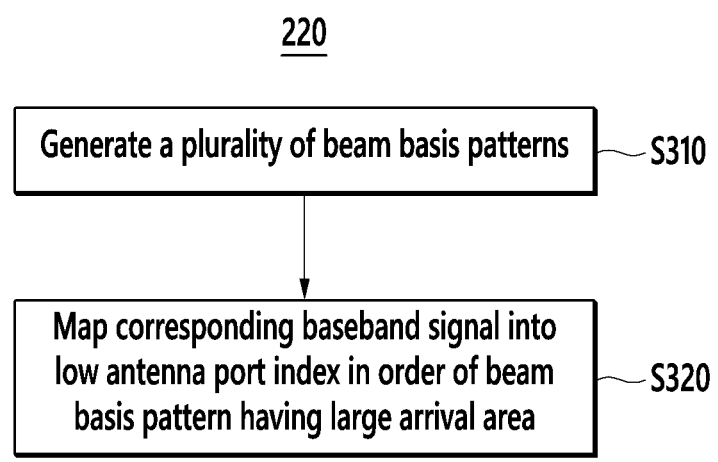
FIGS. 3 and 4 each are diagrams illustrating a method for mapping a baseband signal into a beamspace according to first and second exemplary embodiments of the present invention.

FIG. 3 is a diagram illustrating a method for mapping a baseband signal into a beamspace according to a first exemplary embodiment of the present invention.

Referring to FIG. 3, the beamspace mapping unit 220 decomposes the steering vector of the antenna to generate the plurality of beam basis patterns orthogonal to each other as many as the number of antennas (S310).

The beamspace mapping unit 220 maps the corresponding baseband signal to a low antenna port index in an order of the beam basis pattern having a large arrival area, based on the area of the beam basis patterns (S320). The baseband signals corresponding to each antenna port index are determined by an upper layer scheduler. The beamspace mapping unit 220 maps the baseband signals corresponding to each antenna port index determined by the upper layer scheduler to the beam basis patterns based on the arrival area of the beam basis patterns.

The beam basis pattern configuring the final beam emitted to the wireless space has different values depending on an angle on the 3D space, and therefore a receiving apparatus may receive a lot of beam bases and a few beam bases, depending on the circumferences due to environmental factors such as a reflector and a scatterer that are present at and around the receiving apparatus with respect to a transmitting apparatus.

In this case, when the baseband signals are mapped to the beam basis patterns by the method illustrated in FIG. 3, the receiving apparatus may receive more beam basis patterns with higher probability and the transmitting apparatus may transmit more streams using the spatial multiplexing within a range in which SNR is permitted.

Meanwhile, the beamspace mapping unit 220 may also transmit the to baseband signal from a high antenna port index in an order of the beam basis pattern having a large arrival area However, when defined in the communication standard, since reference signals corresponding to the high antenna port index may be transmitted with a smaller number than reference signals corresponding to the low antenna port index, the beamspace mapping unit 220 first maps signals corresponding to the low antenna port index for more safe transmission.

Figure 4:
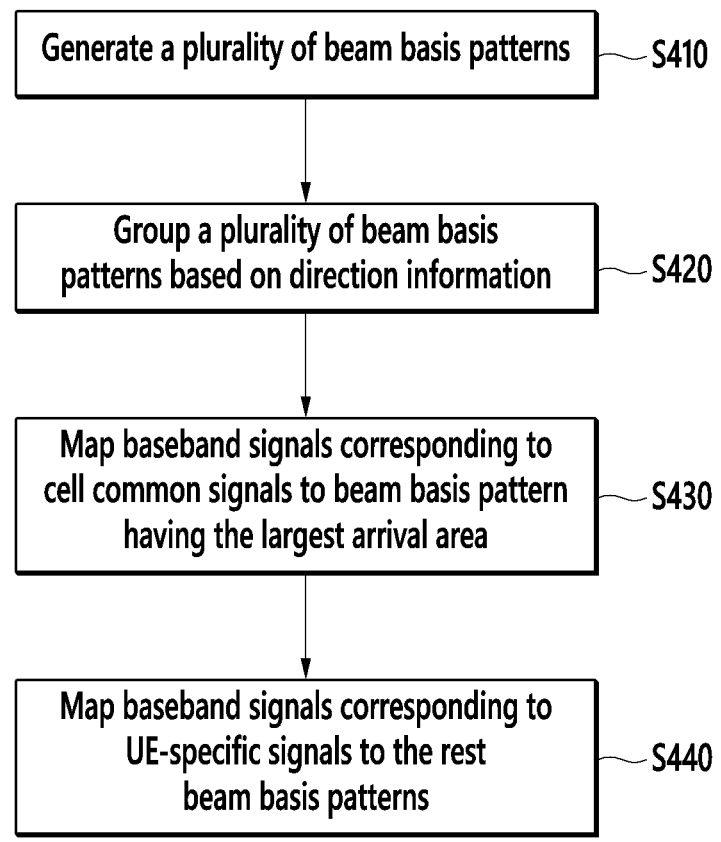
Figure 5:
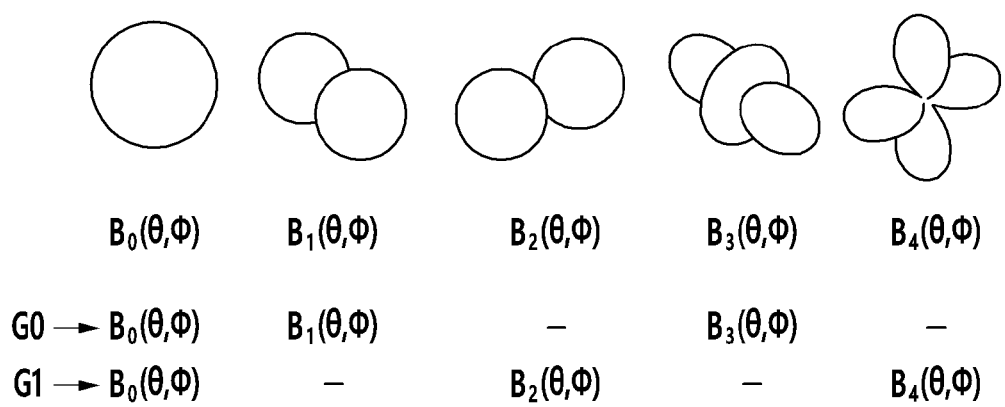
FIG. 5 is a diagram illustrating an example of a method for grouping a beam basis group according to an exemplary embodiment of the present invention.

FIG. 4 is a diagram illustrating a method for mapping a baseband signal into a beamspace according to a second exemplary embodiment of the present invention. FIG. 5 is a diagram illustrating an example of a method for grouping a beam basis group according to an exemplary embodiment of the present invention.

Referring to FIG. 4, the beamspace mapping unit 220 decomposes the steering vector of the antenna to generate the plurality of beam basis patterns orthogonal to each other as many as the number of antennas (S410).

The beamspace mapping unit 220 groups the beam basis patterns into at least one beam basis group based on the direction of the beam basis patterns (S420). The beamspace mapping unit 220 may group the beam basis patterns having the same direction into one beam basis group.

The beamspace mapping unit 220 maps the baseband signals corresponding to cell common signals into the beam basis pattern having the largest arrival area among the beam basis patterns within the beam basis group (S430) and maps the baseband signals corresponding to UE-specific signals to into the rest beam basis patterns (S440).

For example, as illustrated in FIG. 5, the beamspace mapping unit 220 may group the beam basis patterns [$B_0(\theta, \phi)$, $B_1(\theta, \phi)$, $B_3(\theta, \phi)$] into the beam basis group G0 and group the beam basis patterns [$B_0(\theta, \phi)$, $B_2(\theta, \phi)$, $B_4(\theta, \phi)$] into the beam basis group G1. In this case, the cell common signal may be mapped into the beam basis pattern [$B_0(\theta, \phi)$] having the largest arrival area among the beam basis groups G0 and G1 and the UE-specific signal may be mapped into the beam basis patterns [$B_1(\theta, \phi)$, $B_3(\theta, \phi)$ or $B_2(\theta, \phi)$, $B_4(\theta, \phi)$].

In this way, if the baseband signals are mapped to the beam basis patterns, the cell common signal is propagated in all directions and since the UE-specific signal is carried on the beam basis pattern having the specific direction, when the beam basis patterns to which the UE-specific signal is transmitted are received, it may be expected to implement the spatial multiplexing as many as the number of received beam basis patterns. Further, the direction of the beam basis pattern is considered, and therefore the probability of the signal transmission in a wrong direction may be reduced, thereby improving the cell performance.

According to an exemplary embodiment of the present invention, the frame may be configured to make the spatial multiplexing possible in the beamspace MIMO environment, and therefore the framework supporting the spatial multiplexing may be configured. Further, the beam basis to be transmitted may be determined by using the area and the direction information of to the beam basis, and therefore the maximum capacity may be supported.

The exemplary embodiments of the present invention are not implemented only by the apparatus and/or method as described above, but may be implemented by programs recorded in a recording medium for realizing the functions corresponding to the configuration of the exemplary embodiments of the present invention or the recording medium recorded with the programs, which may be readily implemented by a person having ordinary skill in the art to which the present invention pertains from the description of the foregoing exemplary embodiments.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for mapping a baseband signal into a beamspace by a transmitting apparatus in a communication system using a single radio frequency (RF) chain, the method comprising:
    generating baseband signals to be transmitted;
    decomposing a steering vector of an antenna to generate a plurality of beam basis patterns orthogonal to each other; and
    mapping the baseband signals into at least one beam basis pattern using geometrical information of the plurality of beam basis patterns.

2. The method of claim 1, wherein the geometrical information includes area information.

3. The method of claim 2, wherein the mapping includes mapping a baseband signal corresponding to a low antenna port index in an order of a beam basis pattern having a large arrival area.

4. The method of claim 2, wherein the mapping includes mapping a baseband signal corresponding to a high antenna port index in an order of a beam basis pattern having a large arrival area.

5. The method of claim 1, wherein the geometrical information includes direction information.

6. The method of claim 5, wherein the mapping includes:
    grouping the plurality of beam basis patterns into at least one beam basis group based on a direction of the plurality of beam basis patterns; and
    mapping cell common signals and UE-specific signals into beam basis patterns within the at least one beam basis group.

7. The method of claim 6, wherein:
    the mapping of the cell specific signal and the UE-specific signals into the beam basis patterns includes mapping a cell common signal into a beam basis pattern having the largest arrival area within the at least one beam basis group; and
    mapping the UE-specific signal into the rest beam basis patterns other than the beam basis pattern having the largest arrival area within the at least one beam basis group.

8. The method of claim 1, wherein the steering vector is determined depending on a geometrical structure of the antenna.

9. The method of claim 1, wherein the antenna includes one of an electrical steering parasitic array radiator antenna (ESPAR), a switched parasitic array (SPA), and a load modulation antenna.

10. The method of claim 1, further comprising forming a final beam by linearly coupling mapped beam basis patterns with baseband signals.

11. An apparatus for mapping a baseband signal into a beamspace in a communication system, the apparatus comprising:
    at least one processor that is part of one or more units including:
    a baseband signal processing unit generating baseband signals to be transmitted;
    a beamspace mapping unit decomposing a steering vector of an antenna to generate a plurality of beam basis patterns orthogonal to each other and mapping the baseband signals into at least one beam basis pattern based on geometrical information of the plurality of beam basis patterns and characteristics of the baseband signals;

a single RF chain converting the baseband signals into a radio frequency (RF) band signal; and an antenna radiating a signal output from the single RF chain, wherein the at least one processor is configured to execute functions of the one or more units of which the at least one or more processor is a part.

12. The apparatus of claim 11, wherein the geometrical information includes area information.

13. The apparatus of claim 12, wherein the beamspace mapping unit maps a baseband signal corresponding to a low antenna port index in an order of a beam basis pattern having a large arrival area.

14. The apparatus of claim 12, wherein the beamspace mapping unit maps a baseband signal corresponding to a high antenna port index in an order of a beam basis pattern having a large arrival area.

15. The apparatus of claim 11, wherein the geometrical information includes direction information.

16. The apparatus of claim 15, wherein the beamspace mapping unit groups the plurality of beam basis patterns into at least one beam basis group based on a direction of the plurality of beam basis patterns and maps cell common signals and UE-specific signals into beam basis patterns within the at least one beam basis group.

17. The apparatus of claim 16, wherein the beamspace mapping unit maps the cell common signal into the beam basis pattern having the largest arrival area within the at least one beam basis group and maps the UE-specific signal into the rest beam basis patterns other than the beam basis pattern having the largest arrival area.

18. The apparatus of claim 11, wherein the antenna includes one of an electrical steering parasitic array radiator antenna (ESPAR), a switched parasitic array (SPA), and a load modulation antenna.

* * * * *